United States Patent [19]
Wright et al.

[11] Patent Number: 5,626,117
[45] Date of Patent: May 6, 1997

[54] ELECTRONIC IGNITION SYSTEM WITH MODULATED CYLINDER-TO-CYLINDER TIMING

[75] Inventors: Gordon Wright, Plymouth; James R. Clark, Northville; Mark B. Barron, Dearborn, all of Mich.

[73] Assignee: Ford Motor Company, Dearborn, Mich.

[21] Appl. No.: 272,057

[22] Filed: Jul. 8, 1994

[51] Int. Cl.⁶ .................................................. F02P 5/00
[52] U.S. Cl. .................................................. 123/406
[58] Field of Search .................. 123/424, 406, 123/422, 423, 421, 416, 417, 411; 60/284, 286, 300, 303, 285

[56] References Cited

U.S. PATENT DOCUMENTS

| | | | |
|---|---|---|---|
| 3,813,877 | 6/1974 | Hunt | 60/284 |
| 3,927,523 | 12/1975 | Shiyoyama et al. | 60/278 |
| 3,964,258 | 6/1976 | Romano et al. | 60/284 |
| 4,007,590 | 2/1977 | Nagai et al. | 60/284 |
| 4,103,486 | 8/1978 | Hata et al. | 60/284 |
| 4,111,010 | 9/1978 | Minami | 60/276 |
| 5,184,463 | 2/1993 | Becker et al. | 123/424 |
| 5,271,367 | 12/1993 | Abe | 123/424 |

*Primary Examiner*—Raymond A. Nelli
*Attorney, Agent, or Firm*—Allan J. Lippa; Roger L. May

[57] ABSTRACT

An electronic ignition timing control system including a mechanism for retarding the ignition timing for all or a predetermined subset of the cylinders in a multi-cylinder internal combustion engine during cold starts. Spark timing is reduced for a balanced subset of the cylinders for a short time after the engine is started in order to transfer additional heat to the exhaust system to more quickly raise the temperature of the catalyst and thereby reduce undesired emissions.

9 Claims, 2 Drawing Sheets

ELECTRONIC IGNITION SYSTEM WITH MODULATED CYLINDER-TO-CYLINDER TIMING

FIELD OF THE INVENTION

This invention relates generally to electronic engine control systems and more particularly to methods and apparatus for controlling ignition timing in response to changing engine operating conditions.

BACKGROUND OF THE INVENTION

Electronic engine control systems typically respond to sensed conditions, such as engine speed and load, operating temperatures and pressures, accelerator position, and exhaust oxygen levels, in order to properly adjust ignition timing and the rate at which fuel and air are delivered to the engine. Electronic control systems can significantly improve engine efficiency while minimizing undesired exhaust emissions under changing operating conditions.

Such multifunction electronic engine control systems are preferably implemented with integrated circuit microcontrollers operating under stored program control. Suitable microcontrollers are available from a variety of sources and include the devices described in *Motorola's Microcontroller and Microprocessor Families*, Volume 1 (1988), published by Motorola, Inc., Microcontroller Division, Oak Hill, Tex.

The microcontroller in an electronic engine control generates timed output control signals which operate the engine's electronic ignition and fuel injection systems. These control signals are typically synchronized by event signals from one or more sensors which indicate crankshaft position. Commonly called PIPS (Piston Interrupt Signals), these position sensing signals typically initiate microcontroller interrupt-handling routines to perform a variety of control functions synchronized to the engine's rotation. In addition, the microcontroller processes additional analog signal values from other sensors which are converted into digital quantities by analog-to-digital (A-D) converters within the microcontroller.

Electronic engine control systems perform elaborate control functions by processing available digital values which describe the engine's operating condition to vary control inputs which determine the engine's operation. Increasingly sophisticated mechanisms may accordingly be implemented at little additional manufacturing cost to optimize engine performance over a wide range of operating conditions.

The engine control system typically varies the timing of ignition with respect to piston motion to enhance engine performance. Normally, spark timing is adjusted uniformly for all cylinders, varying the time of ignition with respect to the top-dead-center position of the firing cylinder to optimize performance. Although electronic control systems include instrumentalities that may be readily adapted to provide cylinder-by-cylinder control of spark timing in order to equalize burn-rates or to retard the spark for knock-prone cylinders, these techniques are unnecessary for well-designed and well-maintained engines. Cylinder-by-cylinder ignition timing control can, however, yield significant benefits in other ways by following the principles of the present invention.

SUMMARY OF THE INVENTION

In accordance with one aspect of the invention, methods and apparatus are used to vary the time at which the fuel mixture is ignited in one or more predetermined cylinders of the engine in response to at least one predetermined sensed engine operating condition. In a preferred arrangement, the ignition timing signals delivered to selected cylinders are retarded by a significant time delay interval, without correspondingly delaying the ignition signals delivered to the remaining cylinders, to more quickly increase the temperature of the exhaust system. Delaying the ignition timing increases the flow of heat to the engine's exhaust system, especially during cold start conditions, without significantly degrading combustion quality.

When used in conjunction with typical engine and exhaust systems, the more rapid increase in engine exhaust temperatures (1) improves the performance of the exhaust catalyst system, (2) increases the burn-up of hydrocarbons and carbon monoxide at the engine's exhaust port during cold idle and drive-away conditions, and (3) facilitates the use of exhaust gas recirculation (EGR) during cold-start conditions to enhance fuel preparation and reduce undesired emissions. Similarly, the selective retardation of ignition of predetermined cylinders typically reduces feedgas nitrous oxide emissions by reducing the in-cylinder residence time during which chemical reactions which produce such emissions can occur, and permits the air/fuel ratio to be increased during cold engine conditions to increase hydrocarbon oxidation in the catalyst system.

These and other features and advantages of the present invention may be more clearly understood by considering the following detailed description of a preferred embodiment of the invention. In the course of this description, frequent reference will be made to the attached drawings.

DETAILED DESCRIPTION

Figure 1:
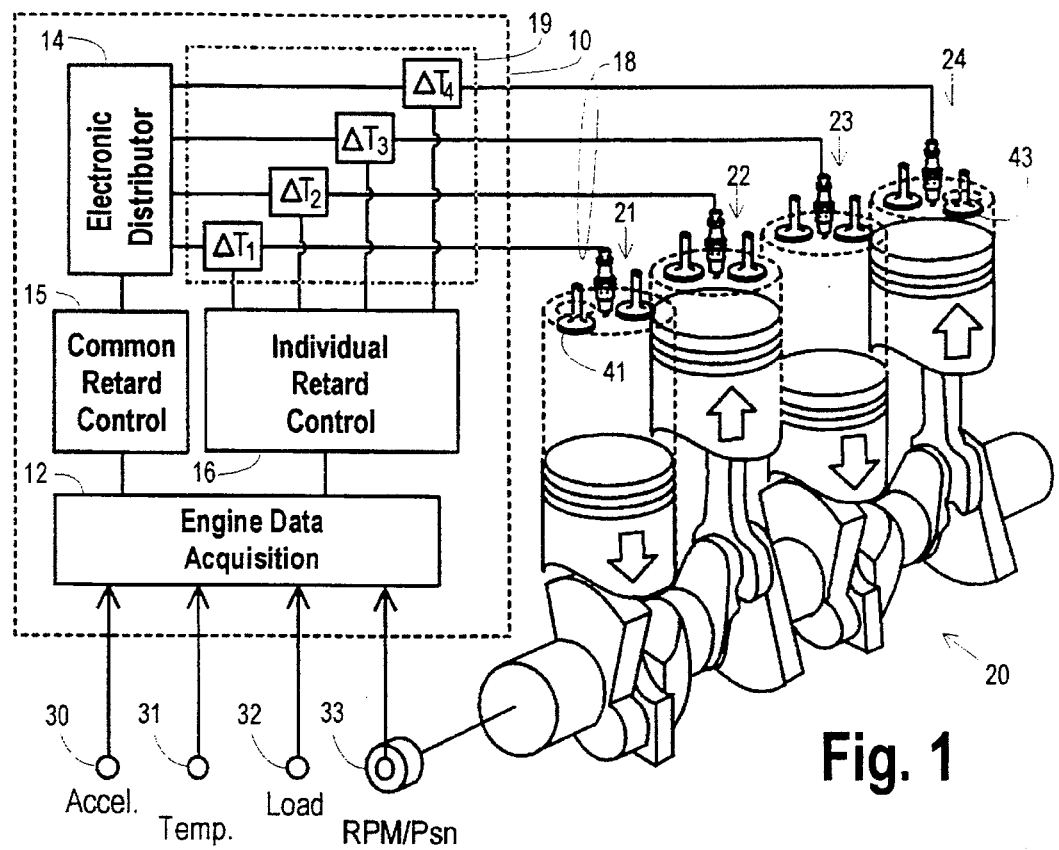
FIG. 1 of the drawings is a pictorial schematic illustration of a vehicle engine control system embodying the principles of the invention.

FIG. 1 of the drawings shows an electronic engine control (EEC) module within the dashed-line rectangle 10 connected to supply ignition signals to a four-cylinder, four-stroke internal combustion engine indicated generally at 20. The control module 10 consists of an engine data acquisition mechanism 12, an electronic distributor 14, a common cylinder ignition retard control mechanism 15, and an individual cylinder ignition retard control mechanism 16.

The distributor 14 produces ignition pulses on four parallel output lines 18 which are respectively connected to the spark plugs of four cylinders indicated at 21–24 in FIG. 1. The timing of the ignition pulses supplied to the cylinders is determined in the first instance by the common retard mechanism 15. The ignitions signals are then further delayed, on a cylinder-by-cylinder basis by individual delay intervals $\Delta T_1$, $\Delta T_2$, $\Delta T_3$ and $\Delta T_4$ for cylinders 21–24 respectively, as schematically illustrated by delay mechanisms shown within the dashed-line rectangle 19 in FIG. 1.

The data acquisition mechanism 12, the common retard control 15, and the electronic distributor 14 within the control module 10 preferably take the form of the preexisting conventional components of the EEC module 10 which operate without modification. The engine data acquisition unit 12 receives signal values via an accelerator angle sensor input 30, a temperature sensor input 31 (connected to receive sensor inputs indicating coolant temperature, fuel temperature, exhaust port temperature, etc.), an engine load (air mass flow rate) sensor input 32, and an engine speed / crankshaft position tachometer input 33. The signals supplied via input 33 typically comprises one or more pulse trains (derived from timing marks on the flywheel or the like) from which engine speed (RPM), engine acceleration and deceleration, and the rotational position of the crankshaft (and hence the position of the piston in each cylinder) can be derived.

The common retard control mechanism 15 operates in accordance with conventional practice to control the electronic distributor 14 to produce, for each of the cylinders in turn, a reference ignition timing signal which establishes the minimum spark advance for best timing (MBT) under the then current engine speed, acceleration, temperature and load conditions.

In accordance with the invention, when digital values available from the data acquisition mechanism 12 manifest predetermined engine conditions indicating cold startup, cold idle, deceleration or accelerator tip-out, the individual retard control circuit 16 introduces a significant additional spark retarding delay for selected cylinders only.

Figure 2:
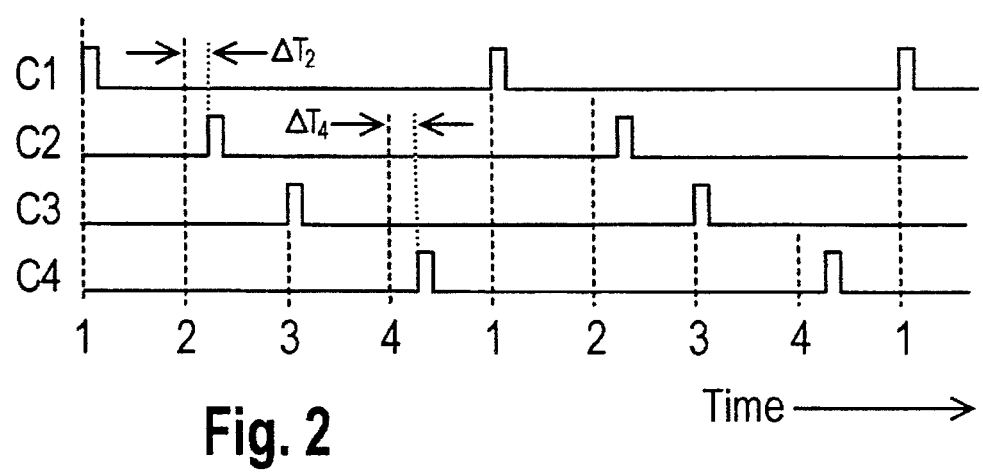
FIG. 2 is timing diagram illustrating the manner in which the time of ignition may be retarded for selected cylinders only to promote exhaust system heating as contemplated by the invention.

The timing diagram seen in FIG. 2 illustrates this operation. As seen in FIG. 2, the MBT firing point established by the common retard control 15 for each of the four cylinders of a four-cylinder, four-stroke engine is shown by the position of the numbered vertical dashed lines in FIG. 2. Waveforms C1–C4 respectively illustrate the ignition timing signals supplied to the four cylinders of the engine, with the ignition signals supplied to the even-numbered cylinders C2 and C4 being delayed from their normal MBT timing by the delay intervals indicated in both FIGS. 1 and 2 by $\Delta T_2$ and $\Delta T_4$. The ignition timing for the odd-numbered cylinders C1 and C3 remains unchanged from the MBT timing established by the common retard control mechanism 15; that is, both $\Delta T_1$ and $\Delta T_3$ are zero-valued.

The additional individual cylinder delay may be introduced for a predetermined actual time interval (established by a system clock, not shown), for a predetermined amount of crankshaft rotation (determined by counting PIP pulses), or may be terminated when defined engine operating conditions are detected (e.g., engine load or temperature values in excess of predefined threshold values). Alternatively, the duration of the introduced individual cylinder delay may be gradually reduced as a function of elapsed time and/or sensed engine operating conditions.

By retarding the spark on a balanced subset of the total number of cylinders for a short period of time during cold start, cold idle and cold drive-away conditions, when the engine temperature is low and reduced power demands are being placed on the engine, the rate at which the engine's exhaust system is heated can be significantly increased. The simple four cylinder, four-stroke internal combustion engine illustrated schematically in FIG. 1 illustrates some of the principles involved. As seen in FIG. 1, the first cylinder 21 is depicted near the bottom of the fuel intake stroke with the intake valve 41 open, the second cylinder 22 is seen near the top of its compression stroke with both valves closed, the third cylinder 23 is seen near the bottom of its power stroke with both valves closed, and the fourth cylinder 24 is shown near the top of its exhaust stroke with the exhaust valve 43 open. Whenever the time of ignition is intentionally retarded from its "best" timing (that is, from the timing which delivers maximum power), several effects occur which are particularly beneficial during cold starting.

Because combustion occurs later in the power stroke and continues into the exhaust stroke when the exhaust valve is open, additional energy is transferred to the exhaust system in the form of heat, rather than being delivered to the power train and/or dissipated as heat through the cylinder walls to the engine coolant. The resulting increase in exhaust system heating during startup more quickly raises the temperature of the catalyst system (not shown), thus reducing tailpipe emissions. Fast catalyst light-off (within 3–10 seconds) is typically advantageous in reducing emission levels during startup in compliance with emission regulations. In addition, increased exhaust temperatures promote increased burn-up of hydrocarbons and carbon monoxide in the exhaust port to reduce feedgas emissions. Retarding spark timing has further effects: the reaction times in which chemical kinetic reactions that produce nitrous oxide occur are reduced, knocking is suppressed, and a leaner air/fuel ratio may be used to promote hydrocarbon burning in the three-way catalyst.

Selective cylinder-by-cylinder modulation of the ignition timing also permits beneficial modifications to be made to the overall engine system. With the reduced expansion ratio created by retarded spark timing, the catalyst can be located farther downstream from the exhaust flange, thus improving catalyst protection for a smaller volume light-off catalyst. In addition, rapid heating of the exhaust system allows exhaust gas recirculation (EGR) mechanisms to be used during cold starts, or to be activated more rapidly after startup, thereby diluting the intake charge without degrading combustion. Moreover, a "dual function" secondary air system can be used to deliver a higher air flow rate to those cylinders with retarded ignition timing to promote additional oxidation.

Figure 3:
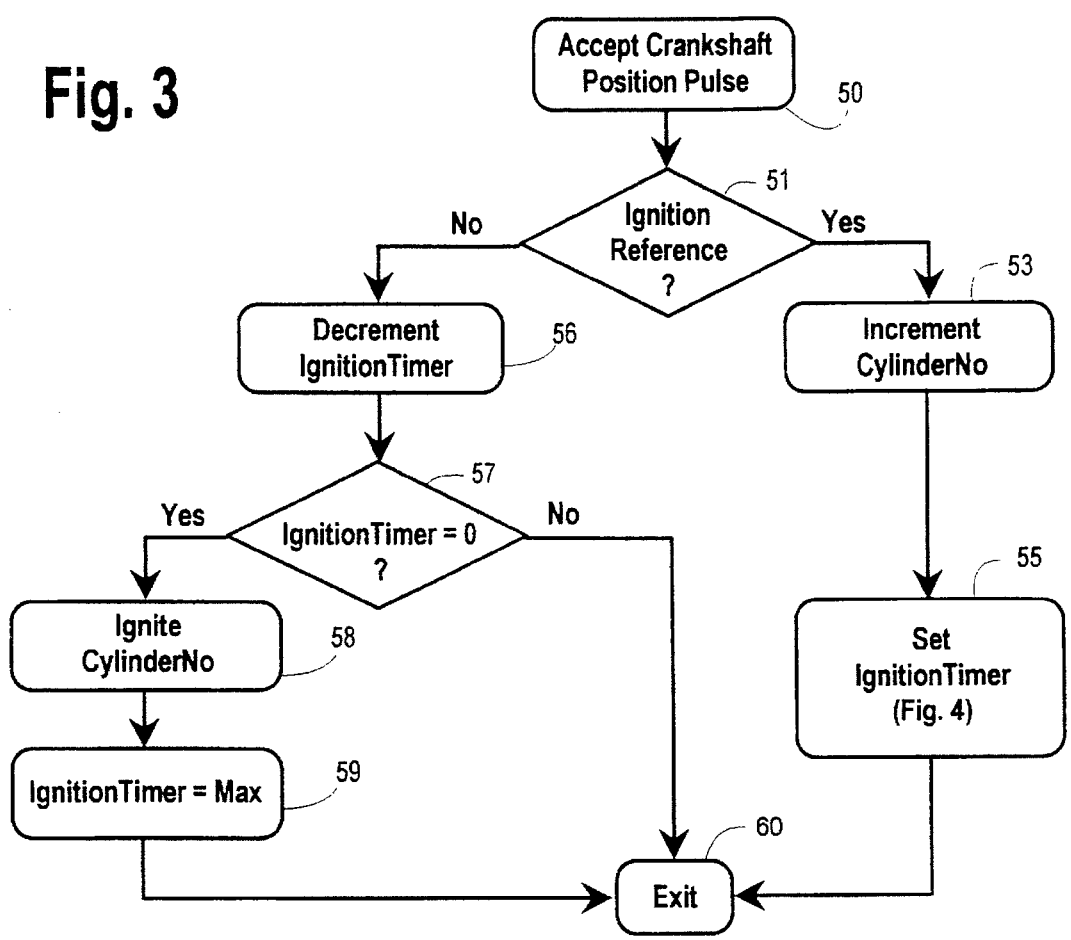
FIGS. 3 and 4 are flow charts illustrating the operation of a preferred mechanism for selectively delaying the ignition time for selected cylinders.
Figure 4:
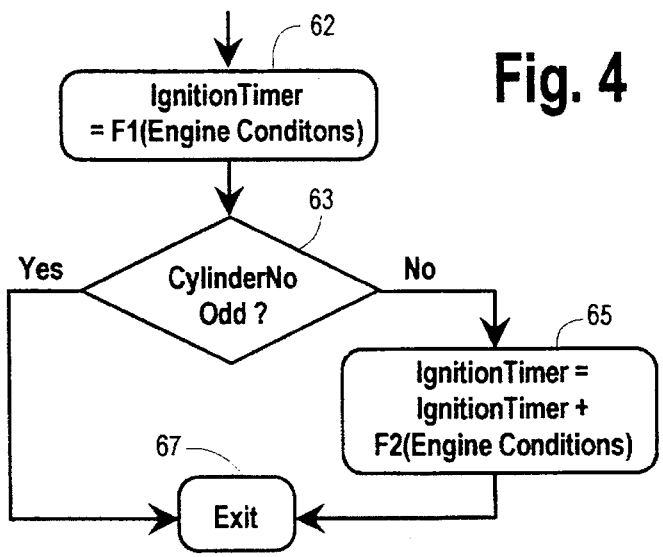

The flowcharts of FIGS. 3 and 4 illustrate an illustrative preferred implementation of a selective ignition retarding scheme embodying the principles of the invention. The individual retard control mechanism illustrated schematically at 16 in FIG. 1 is preferably implemented by programming the engine control unit microcontroller (not shown) to process crankshaft position pulses consisting of a first train of pulses, each of which indicates a predetermined unit of angular rotation (e.g., 1°), in combination with one or more widely spaced pulses which indicate one or more reference position crankshaft positions (e.g., when the piston in cylinder 1 is at top-dead-center). These crankshaft rotation and reference signals are accepted and evaluated as illustrated at 50 and 51 in FIG. 3.

Each time the incoming pulse is identified as a reference pulse, an integer value CylinderNo is incremented at 53 through the repeating succession of values 1, 2, 3, 4, 1, 2, etc. to indicate which cylinder is to receive the next ignition pulse (the distributor 14 seen in FIG. 1 routes the ignition pulse to the appropriate sparkplug based on the value of CylinderNo). After CylinderNo has been incremented at 53 to identify the next cylinder to receive an ignition pulse, a value IgnitionTimer indicative of engine operating conditions which will determine the spark timing for cylinder CylinderNo is set into a timing register as indicated at 55 in FIG. 3. The manner in which the value IgnitionTimer is determined is illustrated in FIG. 4, discussed below.

Assuming a unit rotation pulse is generated for every degree of crankshaft rotation, 89 unit pulses will be detected at 51 between each pair of reference pulses. Each of these unit pulses decrements the value of IgnitionTimer by one as seen at 56 until IgnitionTimer reaches the value zero, as detected at 57, at which time an ignition timing pulse is generated for the cylinder identified by CylinderNo as indicated at 58 in FIG. 3. The value of IgnitionTimer is then set to a high value MAX at 59 to prevent the remaining unit pulses from triggering additional ignition pulses until IgnitionTimer is again reset at 55. Thus, the numerical value IgnitionTimer initially placed in the timing register at 55 establishes the number of degrees of crankshaft rotation which will occur between the detection of the reference position pulse and the time of ignition for a given cylinder.

The value of IgnitionTimer as set into the timing register at 55 may be determined in the manner illustrated by the flowchart of FIG. 4. First, to implement the operation of the common retard control shown at 15 in FIG. 1 and to establish the normal Minimum Best Time (MBT) for all cylinders in normal operation, conventional processing is employed at step 61 to produce a first value for IgnitionTimer in accordance with a first functional relationship F1 which produces an initial numerical value indicative of the desired minimum angular crankshaft rotation between the reference cylinder position detected at 51 and a desired MBT ignition position. Next, at 63, the least significant bit of CylinderNo is tested to determine if CylinderNo is odd or even. If CylinderNo is odd, the MBT value of IgnitionTimer established at 62 is left unchanged. However, if CylinderNo is even, IgnitionTimer is incremented by an amount determined by a second functional relationship F2 to significantly retard the ignition timing for even numbered cylinders.

The functional relationship F2 adds a significant delay to the ignition timing of the even-numbered cylinders beginning at the time predetermined engine conditions are first detected. The triggering condition may be a detected engine start, in combination with a detected engine temperature below a triggering threshold, and may further include certain detected engine running conditions, such as deceleration under low engine temperature conditions.

Once activated, the amount of additional spark retardation added for the selected cylinders (i.e., the magnitude of IgnitionTimer) is established by the function F2 which may take one of a variety of workable forms to yield:

A) a fixed value (thus adding a fixed angular spark retardation) maintained for the selected cylinders during a time interval which persists for either:

1) a predetermined elapsed time (determined by a system clock);

2) a predetermined amount of crankshaft rotation; or 3) a variable elapsed time or angular rotation which is functionally related to:
 a) one or more engine operating temperatures (e.g., coolant, fuel or exhaust temperatures);
 b) the load on the engine (indicated, for example, by the air mass flow rate);
 c) engine acceleration or deceleration;
 d) accelerator angle; or
 e) the combination or one or more of above; or B) a variable value, producing a correspondingly variable amount of angular spark retardation, where the instantaneous magnitude of additional retardataion is determined by:

1) elapsed time (gradually decreasing the amount of additional ignition retardation toward zero during a desired time interval as noted above);

2) the load on the engine;

3) engine acceleration or deceleration;

4) accelerator angle; or 5) a combination or one or more of above-noted variables.

It is to be understood that the specific mechanisms and techniques which have been described are merely illustrative of on application of the principles of the invention. Numerous modifications may be made to the methods and apparatus described without departing from the true spirit and scope of the invention.

What is claimed is:

1. Apparatus for increasing the temperature of the exhaust system of a multi-cylinder internal combustion engine comprising:

means for sensing the rotational position of the crankshaft of the engine and generating an ignition pulse for each given one of said cylinders in synchrony with the motion of the piston in said given cylinder, sensing means for detecting the presence of a first predetermined engine operating condition indicative of an abnormally cold exhaust system, means responsive to said for sensing means for delaying the application of said ignition pulses to predetermined selected ones of said cylinders by a significant delay interval such that additional combustion of the fuel supplied to said selected cylinders occurs within said exhaust system to increase the temperature of said exhaust system, and means for varying the duration of said delay interval as a predetermined function of a second engine operating condition.

2. Apparatus as set forth in claim 1 wherein said means for detecting the presence of said first predetermined operating condition comprises means for detecting an engine temperature below a predetermined threshold temperature.

3. Apparatus as set forth in claim 1 wherein said means for varying the duration of said delay interval comprises means for detecting an engine operating temperature value and means for varying said duration in response to changes in said operating temperature value.

4. Apparatus as set forth in claim 3 wherein said means for detecting said engine operating temperature value includes means for detecting engine coolant temperature.

5. Apparatus as set forth in claim 3 wherein said means for detecting said engine operating temperature value includes means for detecting the temperature of said exhaust system.

6. Apparatus as set forth in claim 1 wherein said means for varying the duration of said delay interval comprises means for detecting an engine load value and means responsive to said engine load value for varying said duration.

7. Apparatus as set forth in claim 1 further including an movable accelerator for controlling the speed of said engine and means for producing an control signal indicative of the position of said accelerator, and wherein said means for varying the duration of said delay interval comprises means for varying said duration in response to variations in said control signal.

8. Apparatus as set forth in claim 1 wherein said means for varying the duration of said delay interval comprises means for generating an acceleration signal indicative of the amount of engine acceleration or deceleration and means for varying said duration in response to said acceleration signal.

9. Apparatus as set forth in claim 1 wherein said predetermined selected cylinders comprise a balanced subset of said cylinders and wherein said means for delaying delays the generation of pulses for said selected cylinders without significantly delaying the generation of said ignition signals for the remaining ones of said cylinders.

* * * * *